United States Patent Office 2,801,544
Patented Aug. 6, 1957

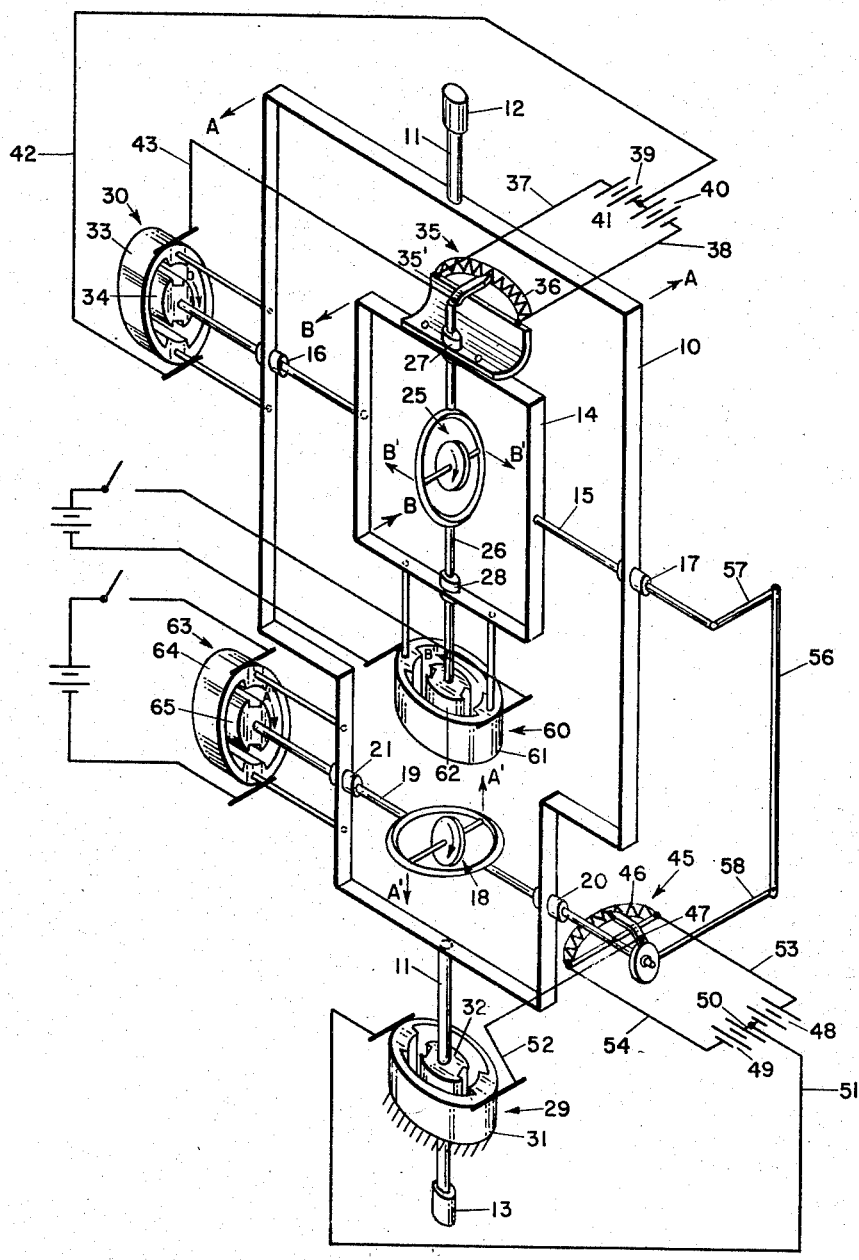

2,801,544

GYROSCOPICALLY STABILIZED PLATFORM SYSTEM

Herbert A. Wagner, Thousand Oaks, Calif., assignor to the United States of America as represented by the Secretary of the Navy Application January 5, 1953, Serial No. 329,753

10 Claims. (Cl. 74—5.34)

(Granted under Title 35, U. S. Code (1952), sec. 266)

The invention described herein may be manufactured and used by or for the Government of the United States of America for governmental purposes without the payment of any royalties thereon or therefor.

The present invention relates to a gyroscopically stabilized platform system and more particularly to a gyroscopically stabilized platform system adapted to be used for homing guidance of a missile wherein a platform is stabilized by two gyroscopes such that when moments act upon the system, correcting moments are developed in the system by precession of the gyroscopes whereby a normal to the plane of the platform will maintain a constant direction in space.

The stabilized platform is adapted to mount the homing guidance apparatus and associated equipment within the missile. The plane of the stabilized platform provides a reference plane from which the guidance apparatus may make any necessary computations to correct the direction of flight of the missile when the missile is homing on a target.

It should be understood that whereas the present invention is particularly adapted for use in a missile, it may also be mounted in any suitable supporting structure wherein it is desired to have a stabilized platform system. For example, the present invention may be mounted in a piloted aircraft or ship, the platform being adapted to mount fire control apparatus or the like.

Heretofore, various platform stabilizing systems have utilized gyroscopes to stabilize the position of the platform relative to its supporting structure. However, these systems are unsatisfactory for use with missiles as there is no provision for correcting the position of the platform when subjected to disturbing moments caused by forces such as friction, inertia and acceleration. Attempts have been made to correct such disturbing moments by the use of servo mechanisms actuated by gyroscopically controlled pickups. However, such servo-operated systems are subject to serious delays between the time that disturbing moments act on the system and the time that correcting moments are produced. Such systems also require very powerful and quick acting servo mechanisms.

The present invention utilizes a plurality of gyroscopes so mounted that they may precess, thereby creating correcting moments in the system which counteract any disturbing moments acting on the system. When a disturbing force acts upon the system, the precessing action will immediately begin, thereby creating a correcting moment within the system without any appreciable time delay and without the necessity of employing servo mechanisms. Torque motors or generators are provided to supply forces to the system whereby the position of the gyroscopes will be automatically altered to return the gyroscopes to their original position after they have been displaced due to precession. Additional torque motors are provided to enable a selective positioning of the stabilized platform.

An object of the present invention is to provide a gyroscopically stabilized platform system such that a normal to the plane of the stabilized platform will maintain a constant direction in space regardless of disturbing forces acting upon the system and movements of the supporting structure.

Another object of the present invention is to provide a stabilized platform particularly adapted to be used for homing guidance of a missile.

Yet another object is to automatically and directly stabilize a platform within a supporting structure.

A further object of the invention is to produce correcting moments in a system of the foregoing type without any appreciable time delay when the system is acted upon by disturbing moments.

Still another object is to provide means whereby the position of the platform in the system may be selectively controlled.

Yet another object of the present invention is to provide a stabilized platform system employing a minimum of parts and which is sturdy and reliable in operation.

Other objects and many of the attendant advantages of this invention will be readily appreciated as the same becomes better understood by reference to the following detailed description when considered in connection with the accompanying drawing which illustrates a schematic view of a preferred embodiment of the invention.

In the drawing, the stabilized platform system consists of a frame 10 mounted upon the reaction spindle 11 journaled within bearings 12 and 13, which are adapted to be mounted within any suitable supporting structure. The frame 14, which schematically illustrates the stabilized platform of the present invention, is mounted upon a supporting spindle 15 which is journaled by means of bearings 16 and 17 within the frame 10 such that spindle 15 extends in a direction perpendicular to that of spindle 11. A gyroscope 18 is mounted upon a spindle 19, the axis of which is normal to the axis of spindle 11, said spindle 19 being journaled by means of bearings 20 and 21 within the frame 10. The gyroscope 18 is schematically indicated as rotating about its spin axis or axis of rotation in a clockwise direction, and it has one degree of freedom, being free to precess about an axis formed by the spindle 19, which will hereinafter be referred to as a precession spindle. A gyroscope 25 is mounted upon a spindle 26 the axis of which is normal to the axis of spindle 15, said spindle 26 being journaled in frame 14 by means of bearings 27 and 28. The gyroscope 25 is also schematically indicated as rotating about its spin axis or axis of rotation in a clockwise direction, and it has one degree of freedom, being free to precess about an axis formed by the spindle 26, which will also hereinafter be referred to as a precession spindle.

During operation of the system, various forces such as friction, inertia, and acceleration, either of the components of the system or the apparatus mounted on platform 14 will produce disturbing forces which will tend to cause the platform to deviate from the desired position. However, as pointed out previously, these forces will be counteracted by forces produced by precession of the gyroscopes. For example, if a force is applied to the system as indicated by the arrows AA, producing a torque about the axis of spindle 11, a correcting moment will be developed due to precession of the gyroscope 18 in the direction of the arrows A'A'. The correcting moment will produce a torque about the axis of spindle 11 opposite to that produced by the disturbing force, whereby the platform 14 remains in the desired position. A force applied to the system oppositely to that indicated by the arrows AA would similarly be counteracted by a correcting moment due to precession of the gyroscope 18 in a direction opposite to that indicated by the arrows A'A'. If a force is applied to the system as indicated by the arrows BB, creating a torque about the axis of spindle 15, a correcting moment will be developed by precession of the gyroscope 25 in the direction of the arrows B'B'. A force applied to the system oppositely to that indicated by the arrows BB would similarly produce a correcting moment due to precession of the gyroscope 25 in a direction opposite to that indicated by the arrows B'B'.

It should be noted that either or both gyroscopes may also rotate in a counterclockwise direction, the only difference being that for a given moment, the respective gyroscopes will precess oppositely when rotating in a counterclockwise direction to the direction in which they precess when rotating in a clockwise direction.

To assure proper operation of the system, it is necessary that provisions be made to prevent the axes of rotation of gyroscopes 18 and 25 from becoming parallel with the axes 11 and 15 respectively. If the axis of rotation of gyroscope 18 should become parallel to axis 11, gyroscope 18 will not precess in response to a disturbing force producing a moment about axis 11 and the system will therefore be free to rotate about said axis in response to such a force, thereby causing the system to become inoperative. Similarly, should the axis of rotation of gyroscope 25 become parallel to axis 15, the system will become inoperative, as the frame 14 will be free to move about axis 15 in response to a disturbing force about such axis. To prevent such inoperative conditions from occurring, torque motors or generators 29 and 30 are provided. The stator 31 and rotor 32 of torque motor 29 are respectively secured rigidly to the supporting structure and reaction spindle 11. The stator 33 and rotor 34 of torque motor 30 are respectively secured rigidly to frame 10 and an extension of supporting spindle 15.

Upon precession of the gyroscopes, it is desirable that the gyroscopes be returned to their original positions as quickly as is practicable. Accordingly, a control or switch means for controlling torque motor 30 is shown as a slidewire potentiometer 35 and consists of two members 35' and 36 which will hereinafter be referred to as a contact arm and a sensing element respectively. The contact arm 35' is rigidly mounted upon an upward extension of the precession spindle 26, and is therefore adapted to turn in response to rotation of the spindle 26. The contact arm 35' engages the sensing element 36 which is rigidly connected to platform 14 and is similar to that used in a conventional potentiometer, and the opposite ends of element 36 are connected by leads 37 and 38 to two batteries 39 and 40 which are connected to each other at opposite poles thereof by lead 41 as indicated. A lead 42 is connected at one end to the lead 41 midway between the batteries 39 and 40, and is connected at its other end to one pole of torque motor 30. A lead 43 is connected at one end to the contact arm 35', and is connected at its other end to the opposite pole of torque motor 30. The batteries 39 and 40 are of equal strength, and the element 36 is connected at one end to the positive pole of the battery 39, and is connected at its other end to the negative pole of battery 40. Since lead 42 is connected midway between the batteries 39 and 40, it is apparent that when contact arm 35' is at the midpoint of element 36, no current will flow through torque motor 30 and it will therefore remain inactive. However, upon precession of the gyroscope 25, the spindle 26 will rotate thereby turning contact arm 35', which will then move away from the midpoint of the element 36.

Upon movement of contact arm 35' away from the midpoint of the element 36, current will flow through torque motor 30. The direction of flow of current through motor 30 depends on the direction of movement of contact arm 35' relative to sensing element 36, and the direction in which motor 30 tends to cause rotor 34 to rotate is in turn dependent on the direction in which the current flows through the motor. It is therefore evident that the direction of the moment developed by motor 30 depends on the direction in which gyroscope 25 precesses. The torque motor 30 is so constructed and is connected to the circuit in such a manner that for a given rotation of the spindle 26 due to the precession of the gyroscope 25, torque motor 30 will be actuated in such a manner as to provide a torque about the spindle 15 in such a direction as to cause the spindle 26 of the gyroscope 25 to return to its original position. For example, when gyroscope 25 precesses in the direction indicated by the arrows B'B', thereby causing precession spindle 26 to rotate in a similar direction, current will flow through motor 30 in such a direction as to tend to cause the rotor 34 to rotate in the direction indicated by arrow b. A torque is therefore provided about the spindle 15 which is opposite to the torque which caused gyroscope 25 to precess, and the gyroscope will consequently return to its original position, whereupon contact 35' will reach the midpoint of element 36 and motor 30 will cease to function. If the gyroscope precesses in the opposite direction, a correcting torque is similarly produced.

A second control or switch means for controlling motor 29 is shown as a slidewire potentiometer 45 and consists of two members 46 and 47 which will hereinafter be referred to as a sensing element and a contact arm respectively. The sensing element 46, which is similar to sensing element 36, is rigidly mounted upon an extension of the spindle 19 and is therefore adapted to turn in response to rotation of such spindle. The sensing element 46 engages the contact arm 47 which is axially fixed upon the aforementioned extension of spindle 19 and is mounted for rotation with respect thereto. The opposite ends of element 46 are connected to two batteries 48 and 49, the batteries being connected to each other at opposite poles by lead 50 as indicated. Lead 51 is connected at one end midway between the batteries 48 and 49, and is connected at its other end to one pole of torque motor 29. A lead 52 is connected at one end to the contact arm 47, and is connected at its other end to the opposite pole of torque motor 29. The batteries 48 and 49 are of equal strength and the element 46 is connected at one end to the positive pole of the battery 48 by lead 53, and is connected at its other end to the negative pole of battery 49 by lead 54. Upon precession of the gyroscope 18, the sensing element 46, the contact arm 47, the electrical circuit 48—54, and the torque motor 29 will operate in such a manner as to provide a torque about the spindle 11 in a direction to cause the gyroscope 18 to return to its original position in a manner similar to the corresponding elements associated with gyroscope 25. Accordingly, upon precession of either gyroscope such that the associated contact arm moves away from the midpoint of the corresponding sensing element, the proper torque motor will be actuated so as to return the gyroscope to the position it originally occupied prior to precession.

It is also essential that the direction in space of a normal to the platform 14 be unaffected by movements of the missile, thereby requiring that the direction in space of the axes of the two gyroscopes be unaffected by such movements. It is evident that movements of the missile about an axis parallel to the axis of spindle 11 will not affect the relative position or the direction in space of any of the components of the system, as the entire system may freely turn about the axis of spindle 11 due to the fact that spindle 11 is rotatably journaled within the missile. Furthermore, it is apparent that movements of the missile about an axis parallel with the axes of rotation of the gyroscopes will not alter the direction in space of a normal to platform 14.

However, should the missile move about an axis parallel to the axis of spindle 15, gyroscope 18 will tend to rotate about the axis of spindle 19, and gyroscope 25 and platform 14 will tend to rotate about the axis of spindle 15, such that the two gyroscopes will remain in the same direction in space and will be rotated relative to frame 10 which moves in accordance with movements of the missile about the axis of spindle 15. Gyroscope 25 and frame 14 may freely rotate about the axis of spindle 15 and the relative position of contact arm 35' and sensing element 36 will remain unaffected, and consequently platform 14 may remain in a constant direction without energizing the associated torque motor 30. However, as pointed out previously, rotation of gyroscope 18 about the axis of spindle 19 tends to cause sensing element 46 to be rotated relative to contact arm 47. It is therefore evident that if contact arm 47 were fixed to frame 10 which supports gyroscope 18, the gyroscope could not freely rotate about the axis of spindle 19 upon rotation of the missile about an axis parallel to the axis of spindle 15 since sensing element 46 and contact arm 47 would be rotated relative to one another. Torque motor 29 would then be energized, thereby applying a force to the system tending to return gyroscope 18 to its original position.

Since the direction in space of the axis of rotation of gyroscope 25 is independent of movements of the missile, it becomes necessary to provide a means which will cause the axis of rotation of gyroscope 18 to remain parallel to the axis of rotation of gyroscope 25, whereby the direction in space of the axes of both gyroscopes will remain unaffected by movements of the missile.

Accordingly, there is provided a connecting rod 56 pivoted at one end to an arm 57 which is rigidly secured perpendicularly to an extension of spindle 15, thereby causing the arm 57 to be actuated in response to rotation of spindle 15. Rod 56 is pivoted at its other end to an arm 58, which in turn is rigidly secured to contact arm 47 such that any rotation of spindle 15 will produce a corresponding rotation of arm 47.

It is therefore evident that upon any movement of the missile about the axis of spindle 15, gyroscope 25, frame 14 and spindle 15 will rotate relative to frame 10 and that linkage 56—58 will cause contact arm 47 to rotate in synchronism with spindle 15. Gyroscope 18 and spindle 19 will also rotate relative to frame 10 and the rate of rotation of spindle 15 and 19 is identical.

Since sensing element 46 rotates in synchronism with spindle 19 and contact arm 47 rotates in synchronism with spindle 15, there will be no relative movement between sensing element 46 and contact arm 47, and torque motor 29 will not be energized. In this manner, the spin axis of gyroscope 18 will remain parallel to the spin axis of gyroscope 25 upon movement of the missile about the axis of spindle 15, and the direction in space of the axes of rotation of the two gyroscopes are independent of movements of the supporting structure.

It should be noted that although the linkage 56—58 maintains the spin axis of gyroscope 18 parallel to the spin axis of gyroscope 25, the contact arm 47 will be maintained at the midpoint of sensing element 46 whereby upon precession of gyroscope 18 due to a disturbing force, the torque motor 29 will be so actuated as to return gyroscope 18 to the position it originally occupied prior to such precession.

It should be understood that it is immaterial whether the sensing element or the contact arm is fixed to the precession spindle of each gyroscope. It is preferred, however, that the leverage 56—58 operate the smaller and lighter member, and consequently the arm 58 is shown as fixed to and turning member 47 which is smaller and lighter than member 46. Furthermore, it should be noted that other types of conventional control means might be employed such as switches utilizing wiping contacts, in which case the conventional contact arm could be controlled by the respective precession spindles. However, slidewire potentiometer controls as shown in the drawing are considered preferable since they are very sensitive and will produce an immediate actuation of the torque motors in response to any movement of the contact arms away from the midpoint of the respective sensing elements. Furthermore, conventional circuitry may be utilized in the electrical network connecting the control means to the associated torque motors, whereby critical frequencies of oscillation may be filtered out and the system suitably stabilized.

In order to change the position of the platform about the axes of spindles 15 and 11, torque motors 60 and 63 are provided. Torque motor 60 has its stator 61 rigidly secured to frame 14, and its rotor 62 rigidly secured to an extension of spindle 26. Torque motor 60 is adapted to rotate frame 14 about the axis of spindle 15. For example, if motor 60 is so actuated as to create a torque tending to rotate spindle 26 in a counterclockwise direction as indicated by arrow B'', gyroscope 25 will tend to precess about an axis which is coincident with the axis of spindle 15 such that platform 14 will be rotated about the axis of spindle 15 in the direction of arrows B—B. Torque applied to spindle 26 in the opposite direction would correspondingly cause rotation of frame 14 in the opposite direction.

Torque motor 63 has its stator 64 rigidly secured to frame 10, and its rotor 65 rigidly secured to an extension of the spindle 19. Torque motor 63 is adapted to rotate frame 10 about the axis of spindle 11. For example, if motor 63 is so actuated as to create torque tending to rotate spindle 19 in a clockwise direction as indicated by arrow A'', gyroscope 18 will tend to precess about an axis which is coincident with the axis of spindle 11 such that frame 10 will be rotated about the axis of spindle 11 in the direction of arrows A—A. Torque applied to spindle 19 in the opposite direction would correspondingly cause rotation of frame 10 in the opposite direction.

Torque motors 60 and 63 are adapted to be selectively actuated so as to rotate in either direction and may be actuated by any suitable conventional remote control means. In this manner, the position of the platform may be selectively changed from a remote location at any time.

The operation of the device is as follows: The platform system is journaled within bearings 12 and 13 which are mounted in a missile and the gyroscopes are continuously rotated in a clockwise direction as indicated. During flight of the missile, disturbing moments which may be developed in the system about the axis of spindle 11 will be counteracted by precession of gyroscope 18, which is returned to its original position by operation of torque motor 29. Disturbing moments which may be developed in the system about the axis of the spindle 15 are counteracted by precession of gyroscope 25, which is returned to its original position by operation of torque motor 30. In this manner, the position of platform 14 remains unaffected by any disturbing moments which may be developed within the system. Movements of the missile will not affect the direction in space of the axes of rotation of the gyroscopes as pointed out previously, and torque motors 29 and 30 will be energized only under the influence of disturbing moments in the system. The position of the platform may be selectively varied about the axes of spindles 15 and 11 by means of torque motors 60 and 63 respectively.

It is apparent from the foregoing that there is provided a gyroscopically stabilized platform system, particularly adapted to be used for homing guidance of a missile wherein a normal to the plane of the stabilized platform will maintain a constant direction in space regardless of disturbing forces acting upon the system and of movements of the supporting structure. The platform of the system is automatically and directly stabilized within the supporting structure and means is provided for selectively controlling the position of the platform. When disturbing moments act upon the system, correcting moments are developed in the system without any appreciable time delay, and the system employs a minimum of parts and yet is sturdy and reliable in operation.

Obviously many modifications and variations of the present invention are possible in the light of the above teachings. It is therefore to be understood that within the scope of the appended claims the invention may be practiced otherwise than as specifically described.

I claim:

1. A stabilized platform system which comprises a first frame, a first gyroscope having a precession spindle journaled in said first frame, a second frame, a second gyroscope having a precession spindle journaled in said second frame, said second frame being supported by a spindle journaled in said first frame, and means for maintaining the axis of rotation of said first gyroscope parallel to the axis of rotation of said second gyroscope, said last mentioned means including a first control member connected to and actuated by said first precession spindle and a second control member connected to and actuated by said support spindle, said control members being in cooperative engagement with one another.

2. A stabilized platform system which comprises a reaction spindle adapted to be journaled in a supporting structure, a first frame mounted on said reaction spindle, a first gyroscope having a first precession spindle the axis of which is normal to the axis of said reaction spindle, said first precession spindle being journaled in said first frame, a supporting spindle journaled in said first frame and having an axis which is parallel to the axis of said first precession spindle, a second frame mounted on said supporting spindle, a second gyroscope having a second precession spindle the axis of which is normal to the axis of said supporting spindle, said second spindle being journaled in said second frame, and means for maintaining the axis of rotation of said first gyroscope parallel to the axis of rotation of said second gyroscope, said last mentioned means including a first control member connected to and actuated by said first precession spindle and a second control member connected to and actuated by said support spindle, said control members being in cooperative engagement with one another.

3. A stabilized platform system which comprises a reaction spindle adapted to be journaled in a supporting structure, a first frame mounted on said reaction spindle, a first gyroscope having a first precession spindle journaled in said first frame, a second frame mounted on a supporting spindle journaled in said first frame, a second gyroscope having a second precession spindle journaled in said second frame, a first torque motor connected to said reaction spindle, a second torque motor connected to said supporting spindle, and means for maintaining the axis of rotation of said first gyroscope parallel to the axis of rotation of said second gyroscope, said last mentioned means including a first control member connected to and actuated by said first precession spindle and a second control member connected to and actuated by said support spindle, said control members being in cooperative engagement with one another.

4. A device as defined in claim 3 which also comprises a first control circuit for said first torque motor, said first circuit including control means connected to said first precession spindle, and a second electrical control circuit for said second torque motor, said second circuit including control means connected to said second precession spindle.

5. A stabilized platform system which comprises a reaction spindle adapted to be journaled in a supporting structure, a first frame mounted on said reaction spindle, a first gyroscope having a first precession spindle journaled in said first frame, a second frame mounted on a supporting spindle journaled in said first frame, a second gyroscope having a second precession spindle journaled in said second frame, a first torque motor connected to said first precession spindle, a second torque motor connected to said second precession spindle, and means for maintaining the axis of rotation of said first gyroscope parallel to the axis of rotation of said second gyroscope, said last mentioned means including a first control member connected to and actuated by said first precession spindle and a second control member connected to and actuated by said support spindle, said control members being in cooperative engagement with one another.

6. A device as defined in claim 5, including a first electrical control circuit for said first torque motor, a second electrical control circuit for said second torque motor, and selectively operable control means for each of said circuits.

7. A stabilized platform system which comprises a reaction spindle adapted to be journaled in a supporting structure, a first frame mounted on said reaction spindle, a first gyroscope having a first precession spindle journaled in said first frame, a second frame mounted on a supporting spindle journaled in said first frame, a second gyroscope having a second precession spindle journaled in said second frame, a first torque motor including a member connected to said reaction spindle, a second torque motor including a member connected to said supporting spindle, a third torque motor including a member connected to said first precession spindle, a fourth torque motor including a member connected to said second precession spindle, and means for maintaining the axis of rotation of said first gyroscope parallel to the axis of rotation of said second gyroscope, said last mentioned means including a first control member connected to and actuated by said first precession spindle and a second control member connected to and actuated by said support spindle, said control members being in cooperative engagement with one another.

8. A device as defined in claim 7 which comprises a first electrical control circuit for said first torque motor, said first circuit including control means connected to said first precession spindle, a second electrical control circuit for said second torque motor, said second circuit including a control means connected to said second precession spindle, a third electrical circuit for said third torque motor, a fourth electrical circuit for said fourth torque motor, and selectively operable control means for each of said third and fourth circuits.

9. A device as defined in claim 3, said first torque motor having a member adapted to be mounted in said supporting structure, a first electrical control circuit for said first torque motor including control means comprising a contact arm connected to said supporting spindle and a sensing element connected to said first precession spindle, said second torque motor having a member connected to said first frame and a second electrical control circuit for said second torque motor including control means comprising a sensing element connected to said second frame and a contact arm connected to said second precession spindle.

10. A device as defined in claim 5, said first torque motor having a member connected to said first frame and a first electrical control circuit, said second torque motor having a member connected to said second frame and a second electrical control circuit, and selectively operable control means for each of said circuits.

References Cited in the file of this patent

UNITED STATES PATENTS

| | | |
|---|---|---|
| 2,199,294 | Seligmann | Apr. 30, 1940 |
| 2,409,875 | Martin | Oct. 22, 1946 |
| 2,507,451 | Molnar et al. | May 9, 1950 |
| 2,591,697 | Hays | Apr. 8, 1952 |
| 2,606,448 | Norden et al. | Aug. 12, 1952 |